United States Patent [19]

Segovia

[11] 3,873,665

[45] Mar. 25, 1975

[54] PROCESS FOR PRODUCING A REVERSE OSMOSIS MODULE

[75] Inventor: Gilbert Segovia, Santa Ana, Calif.

[73] Assignee: Oxy Metal Industries Corporation, Lyndhurst, N.J.

[22] Filed: Aug. 6, 1973

[21] Appl. No.: 386,086

[52] U.S. Cl............... 264/321, 210/321, 210/490, 210/500, 264/345, 264/348
[51] Int. Cl............................................. B29d 7/08
[58] Field of Search ............ 210/23, 321, 490, 500; 264/41, 49, 321, 345, 348; 29/163.5 F; 117/95

[56] References Cited
UNITED STATES PATENTS

| | | | |
|---|---|---|---|
| 2,864,506 | 12/1958 | Hiskey | 210/321 |
| 3,715,036 | 2/1973 | Hamer | 210/321 |

*Primary Examiner*—Frank A. Spear, Jr.
*Attorney, Agent, or Firm*—Arthur E. Kluegel; Richard P. Mueller; B. F. Claeboe

[57] ABSTRACT

This disclosure is directed to a process for producing a reverse osmosis module in which a delicate reverse osmosis membrane is wrapped about a coil form. The rejection characteristics of the reverse osmosis membrane are developed by a heat treat process. Upon termination of the heat treat process and while conditions of the heat treat process are maintained within the membrane, the membrane is coiled about a coil form in order to form a reverse osmosis module in which the membrane is in a helical configuration. The membrane is cooled in its helical configuration.

6 Claims, No Drawings

PROCESS FOR PRODUCING A REVERSE OSMOSIS MODULE

BACKGROUND OF THE INVENTION

U.S. Pat. application Ser. No. 162,247, filed July 13, 1971 for a Helical Reverse Osmosis Segment forms the background of this invention. That patent application is assigned to the same assignee as this application and it is herein incorporated by reference. That application teaches that a reverse osmosis module and a method for producing such a module. The process taught for producing the module is one wherein a reverse osmosis membrane of desired length is manufactured. A porous supporting member is applied to the exterior of the membrane to enable the membrane to withstand internal pressures and couplings are applied to opposite ends of the membrane. The reverse osmosis membrane is wound upon a coil form at a time when the membrane had a heated liquid contained within the interior thereof. The heated liquid is not at a temperature sufficient to heat treat the reverse osmosis membrane and thereby develop its rejection characteristics.

The formulation of reverse osmosis membranes, particularly of the asymmetric cellulose acetate type and the heat treatment thereof to control their rejection characteristics is fully discussed in U.S. Pat. No. 3,446,359. The manner of applying a porous supporting member to the exterior of a membrane is disclosed in co-pending U.S. Pat. application Ser. No. 198,612, filed Nov. 15, 1971. The manner of applying couplings to the opposite ends of the membrane is disclosed in co-pending U.S. Pat. application Ser. No. 194,123, filed Nov. 1, 1971, now U.S. Pat. No. 3,794,360. The latter two patent applications are assigned to the same assignee as this patent application and are herein incorporated by reference.

With respect to the process for forming a reverse osmosis module as taught in application Ser. No. 162,247, after the membrane has been coiled on a coil form, it is cooled and subsequently heat treated. In the heat treat process, a heat treatment fluid under set pressure and temperature conditions is pumped through the membrane to develop its rejection characteristics.

It was found that the process for forming the reverse osmosis module described in application Ser. No. 162,247 generated some problems. The problems which occurred included membrane creasing and spool warping and/or cracking. It was also found, that in some cases, the reverse osmosis membrane had a tendency to shrink excessively within its housing. The creasing and the shrinkage promote membrane damage and decreased the membrane's salt rejection properties by a significant amount. Cracked spools permitted leakage of permeate which was operationally unsatisfactory.

It is, therefore, an object of this invention to provide a process for producing a reverse osmosis module in which the heat treating of the membrane does not cause any shrinkage of a membrane in a coiled configuration. It is still another object of this invention to provide a process for producing a reverse osmosis module in which the heat treating of the membrane to develop its rejection characteristics precedes (or partially precedes) the coiling of the membrane on a coil form. It is a further object of this invention to provide a process for producing a reverse osmosis module in which both the heat treating and the coiling operations to form the module are carried out one after the other with some overlap in sequence thereby rendering the process more economical. It is the principal object of this invention to provide a process for producing a reverse osmosis module in which the reverse osmosis membrane has a greater ability for rejecting material on a higher mass flow rate than membranes fabricated in previously known manners.

SUMMARY OF THE INVENTION

This invention relates to a process for producing a reverse osmosis module and, more particularly, to a process for producing a reverse osmosis module in which a reverse osmosis membrane is wrapped about a coil form.

In the process for producing a reverse osmosis module the general steps known in the prior art include the manufacturing of a reverse osmosis membrane of a desired length. A porous supporting member is applied to the exterior of the membrane to enable the membrane to withstand internal pressures. The prior art also teaches the application of couplings to opposite ends of the membrane.

The process of this invention teaches an improvement of the process for producing reverse osmosis modules containing the above outlined steps. The improvement is as follows. One end of the membrane is connected to a pressurized source of heat treatment fluid. The other end of the membrane is connected to a flow restriction device. The heat treatment fluid is initially passed through the membrane to pressurize the membrane to a level of about 10 psig. The temperature of the heat treatment fluid flowing through the membrane is increased to about 60°C while maintaining the pressure established within the membrane at about 10 psig. The temperature and the pressure of the heat treatment fluid flowing through the membrane is increased until the membrane has heat treatment fluid flowing therethrough having a temperature in the range of 72°C to 94°C and a pressure of 60 psig to 120 psig.

The temperature and the pressure established within the membrane is maintained for a period of 15 minutes to 45 minutes to heat treat the membrane and thereby establish the rejection characteristics of the membrane for a reverse osmosis operation. The membrane is wound onto a coil form to form a helical reverse osmosis module, the winding taking place while the membrane has the pressure and the temperature of the heat treat step still maintained therein. The wound membrane is cooled from its heat treat temperature by supplying cooled heat treatment fluid for flow through the membrane. The pressure of the heat treatment fluid is maintained at the heat treat pressure during this cooling. When the membrane is cooled below a selected temperature by the cooler heat treatment fluid, the pressure of the heat treatment fluid is released gradually to zero gauge pressure.

It has been found that a reverse osmosis module produced in the above manner has on the average, rejection characteristics above and beyond the rejection characteristics of modules formed as set forth in application Ser. No. 162,247. The process of this invention is economical in that the heat treatment and coiling steps are carried out one after the other in a sequential and orderly manner or in a partially or completely combined manner. The processing is also more economical because the module is handled less and the possibility of operator error is reduced.

DESCRIPTION OF THE PREFERRED EMBODIMENT

A process for producing a reverse osmosis module which constitutes an improvement of prior methods is described. The prior art is best depicted by the previously mentioned U.S. Pat. application Ser. No. 162,247. This patent application discusses the apparatus and sets the stage for the departure taught in this application. Other prior art that is relevant is the aforementioned U.S. Pat. No. 3,446,359 which teaches a method for making a reverse osmosis membrane of cellulose acetate. Other prior art of pertinent interest here includes the previously mentioned applications Ser. No. 194,123 and Ser. No. 198,612 which respectively teach methods for and construction of fittings for connecting to the ends of the reverse osmosis membrane and a method for forming a porous or braided support externally of the membrane.

The methodology taught in this application constitutes an improvement on a process for producing a reverse osmosis module in which a reverse osmosis membrane is wrapped about a coil form which generally includes some of the prior art's steps. The first such step is that of manufacturing a reverse osmosis membrane of desired length. A porous supporting member is applied to the exterior of the membrane to enable the membrane to withstand internal pressures. Couplings are applied to the opposite ends of the membranes.

In accordance with this invention, one end of the membrane, by means of its associated coupling, is connected to a pressurized source of heat treatment fluid. In this particular case where a cellulose acetate membrane is to be treated, the heat treatment fluid is water. The pressurized source of heat treatment fluid also must have the capability of applying a pressure up to 120 psig to the fluid and must have a capability of heating the fluid and maintaining the fluid to be utilized in a heat treatment at a selected temperature up to 94°C.

The other end of the membrane to be treated is connected to a flow restriction device. Such devices are well known in the art and the purpose thereof is to constrict the flow rate through the membrane so that pressures within the membrane may be developed to as high as 120 psig. After the membrane is connected to the source of heat treatment fluid, the heat treatment fluid is initially passed through the membrane and the restriction device is so controlled that the pressure within the membrane is brought to a level of about 10 psig. At this particular time the heat treatment fluid is at room temperature. This initial pressurizing of the membrane is for the purpose of keeping the membrane from collapsing when heat treatment fluid, above room temperature, is introduced into the composite tubular assembly.

The temperature of the heat treatment fluid flowing through the membrane is gradually increased at a rate of about 10°C per minute to a temperature of about 60°C. During this increase in temperature of the heat treatment fluid, the pressure established within the membrane of about 10 psig is maintained. The purpose of maintaining the pressure while increasing the temperature is for supporting the membrane against the supporting flexible member.

The temperature and the pressure of the heat treatment fluid flowing through the membrane are simultaneously increased until the membrane has a heat treatment fluid flowing therethrough having a temperature in the range of 72°C to 94°C and a pressure of 60 psig to 120 psig. The rate of increase of the pressure of the heat treatment fluid is at a rate of about 10 psig for every minute. The final heat treat temperature selected depends upon the permeation characteristics required from the membrane. In general, it is preferred to operate at a pressure of about 90 psig while heat treating the membrane. This particular heat treatment pressure is most desirable because it is the optimum pressure for the membrane and supporting member to readily yield during the coiling operation.

The temperature and the pressure established within the membrane are maintained for a period from 15 to 45 minutes to heat treat the membrane and thereby establish its rejection characteristics for a reverse osmosis operation. The preferred heating time is about 30 minutes as this will develop the required characteristics of the material.

After the temperature and the pressure have been maintained for the required length of time to establish the rejection characteristics of the membrane, the membrane is wound on a coil form. The membrane is wound on the coil form to form a helical reverse osmosis module. The winding takes place while the membrane has the pressure and the temperature of the heat treat step still maintained therewithin. The full pressure and temperature are maintained during the winding in order to insure that the desired permeation characteristics of the membrane are permanently set. The heat treating and winding steps can be carried out sequentially, simultaneously, or with some overlap in time of execution so as to minimize the total elapsed time consumed during this portion of the manufacturing process.

After winding, a fluid having a cooler temperature is supplied to the wound membrane to cool it off. During this cooling cycle, the pressure of the fluid is maintained at the heat treat pressure. The fluid for cooling the membrane must go from high temperature directly to room temperature. Rapid quenching promotes retention of desired permselective properties. The reason for maintaining the pressure while cooling the membrane is to prevent collapsing of the membrane before the membrane is cool enough (strong enough) to maintain its tubular configuration. After the membrane has been cooled to a temperature generally below 30°C, the heat treatment pressure is released gradually on the membrane. The pressure therewithin is decreased at a rate of about 18 psig per minute till the membrane reaches 0 psig. At this particular point the fabrication of the membrane is complete and the outer protective structure may be assembled thereto as discussed more fully in the aforementioned application Ser. No. 162,247.

As previously discussed, a reverse osmosis module produced in accordance with this application has a greater ability for rejecting material than that discussed in the previously mentioned application. Tests have shown that a typical membrane produced in this manner is capable of rejecting, for example, 95% (NaCl in $H_2O$, 600 psig, 77°F, 5,000 ppm NaCl feed, 2 hr. test) as compared to modules made by the prior method which rejects 92%. The additional benefits of using this process over the other process are as follows: reduction of membrane creasing elimination of spool warping and/or cracking, and reduced cost of fabrication.

There has been disclosed herein a process for producing a reverse osmosis module in which the reverse osmosis membrane is wrapped about a coil form. After reviewing the disclosure of this application, one skilled in the art would have many modifications thereof which fall within the true spirit and scope of this invention. It is intended that all such modifications which fall within the true spirit and scope of this invention be included within the terms of the appended claims.

I claim:

1. In a process for producing a reverse osmosis module in which a reverse osmosis membrane is wrapped about a coil form which generally includes the steps of: manufacturing a reverse osmosis membrane of a desired length; applying a porous supporting member to the exterior of the membrane to enable the membrane to withstand internal pressures; and applying couplings to the opposite ends of the membrane; the improvement comprising:

connecting one end of the membrane to a pressurized source of heat treatment fluid;

connecting the other end of the membrane to a flow restrictive device;

passing the heat treatment fluid through the membrane to pressurize the membrane to a level of about 10 psig;

increasing the temperature of the heat treatment fluid flowing through the membrane to about 60°C while maintaining the pressure established within the membrane at about 10 psig;

increasing the temperature and the pressure of the heat treatment fluid flowing through the membrane until the membrane has heat treatment fluid flowing therethrough having a temperature in the range of 72°C to 94°C and a pressure of 60 psig to 120 psig;

maintaining the temperature and the pressure established within the membrane by the last process step for a period of from 15 minutes to 45 minutes to heat treat the membrane and thereby establish the characteristics of the membrane for a reverse osmosis process;

winding the membrane on to the coil form to form a helical reverse osmosis module, the winding taking place while the membrane has the pressure and the temperature of heat treat steps still maintained therewithin;

cooling the wound membrane from its heat treat temperature by supplying cooled fluid for flow through the membrane, the pressure of the cooling fluid being maintained at heat treat pressure during this cooling; and releasing the pressure of the heat treatment fluid on the membrane gradually to 0 psig when the membrane has cooled below about 30°C.

2. The process of claim 1 wherein: the step of increasing the temperature and the pressure of the heat treatment fluid is carried out simultaneously and the pressure is raised from 10 psig to the final pressure in the range of 60 psig to 120 psig at about the rate of 10 psig per every minute.

3. The process of claim 2 wherein: said final heat treat pressure is about 90 psig.

4. The process of claim 3 wherein: said heat treat time is about 30 minutes.

5. The process of claim 1 wherein: the cooling of the membrane from its heat treat temperature is carried out by introducing cooling fluid having a temperature in the range of 20°C to 25°C.

6. The process of claim 5 wherein: the heat treat pressure is released on the membrane when the membrane has cooled to a temperature of about 20°C to 25°C.

* * * * *